US005379674A

United States Patent [19]

Hoshino

[11] Patent Number: 5,379,674

[45] Date of Patent: Jan. 10, 1995

[54] BEATER SWING CONTROL FOOT PEDAL FOR DRUM

[75] Inventor: Yoshiki Hoshino, Aichi, Japan

[73] Assignee: Hoshino Gakki Co., Ltd., Nagoya, Japan

[21] Appl. No.: 58,015

[22] Filed: May 5, 1993

[30] Foreign Application Priority Data

Jul. 16, 1992 [JP] Japan .............................. 4-056215[U]

[51] Int. Cl.[6] .................................................. G03B 7/00

[52] U.S. Cl. ..................................................... 84/422.1

[58] Field of Search ......................................... 84/422.1

[56] References Cited

U.S. PATENT DOCUMENTS 4,756,224 4/1988 Lombardi .......................... 84/422 R 4,873,910 10/1989 Kurosaki ............................ 84/422.1

FOREIGN PATENT DOCUMENTS 0646530 10/1962 Italy .................................... 84/422.1

63-33262 5/1988 Japan .

*Primary Examiner*—Michael L. Gellner

*Assistant Examiner*—Patrick J. Stanzione

*Attorney, Agent, or Firm*—Ostrolenk, Faber, Gerb & Soffen

[57] ABSTRACT

A foot pedal for a drum beater having a pivotable pedal connected by a strap like link member or chain to the surface of a rotatable swinging member supported on a pivot journal on the stand of the foot pedal. A drum beater attached to the swinging member for being swung thereby toward or away from a drum. The surface of the swinging member having a large diameter curvature section and behind it a small diameter curvature section. The linking member is moved off the large diameter section of the surface of the swinging member as the drum beater is swung from an inoperative position toward an operative position at the drum and is moved off the small diameter section of the swinging member in the final part of the trip of the drum beater toward the drum head.

12 Claims, 11 Drawing Sheets

BEATER SWING CONTROL FOOT PEDAL FOR DRUM

BACKGROUND OF THE INVENTION

The invention relates to an improved foot pedal for a drum, and particularly to the swinging member on which the drum beater swings.

A foot pedal for a drum is ordinarily linked to a swinging member, such as a sprocket, that rotates integrally with the drum beater. The link connection is by means of a linking member, such as a chain, strap, etc. When the foot pedal is stepped on, the swinging member rotates to cause the beater to beat the drum head.

The shapes of known swinging members can be generally classified into two major categories. One is a generally round wheel where the rotary shaft of the beater and the center of the pitch circle of the rotary sprocket are the same. An example of this is shown in FIG. 10. It includes a foot pedal device 100 having a pedal plate 101. A swinging member 103 includes a peripheral sprocket 104. A flexible linking member 105 is wrapped on and engages the sprocket. A beater 106 is carried on a beater rotary shaft 107. Rotation of the member 103 swings the shaft 107 to strike a drum head 108. A hoop clamp 109 holds the pedal to the drum.

As is shown in FIG. 11, the ratio between the step-in height of the free swinging tip of the pedal plate 101 and the rotary distance of the beater rotary shaft 107 remains constant during use of the swinging member 103. As a consequence, the step-in speed of the pedal plate 101 and the beating speed of the beater 106 are in proportion to each other. Because of this, the operating feeling remains mild, without any peculiar idiosyncracy, and many performers like that. The only way to increase the beating speed of the beater 106 is to increase the step-in speed of the pedal plate 101. This may cause the performer to become greatly fatigued.

Another swinging member is normally in the form of an eccentric wheel. An example is shown in Japanese Utility Model Publication Sho 63-33262 and is shown in FIG. 12 of this specification. A beater rotary shaft 117 is positioned to the rear of the center of the pitch circle of the sprocket 114 of the swinging member 113. As the pedal plate 111 of the device 110 is stepped on, the distance between the beater rotary shaft 117 and the sprocket 114 gradually decreases. The same reference numbers as in FIG. 10 indicate the same elements.

As can be understood from FIG. 13, the rotary angle of the beater as compared with the step-in depth of the pedal plate increases in an accelerating fashion, which increases the beating speed of the beater. This enables the performer to increase the beating speed of the beater easily even while employing the same beating speed. As a result, the drum head can be beaten more strongly. However, the accelerated feeling of the stepping foot of the performer and the accelerated state of the beater due to the rotation of the swinging wheel are different using such an eccentric wheel, with a consequence that the performer will have to acquire skill in this operation. Thus, it may be difficult to acquire a satisfactory operational feeling in this respect.

SUMMARY OF THE INVENTION

The object of the invention is to provide a foot pedal for a drum wherein the beating speed of the beater can be accelerated with a pedal operating feeling which is as naturally close to that experienced with a genuinely round wheel as possible and where a powerful performance can be rendered by the performer.

The foot pedal for the drum includes a swinging member for the beater which is linked to the pedal tip by means of a linking member. According to the invention, the front side of the swinging member is formed like a large diameter wheel, and a small diameter wheel is formed at the rear side of the swinging member. The front and rear sides are connected through an intermediate part. The linking member acts on the large diameter wheel part until immediately before the drum head beating position of the beater, and the linking member acts on the small diameter wheel part up to the beating position.

Other features and advantages of the present invention will become apparent from the following description of the invention which refers to the accompanying drawings.

BRIEF DESCRIPTION OF THE DRAWINGS

FIG. 7 shows the swinging member in its state immediately after the pedal has been stepped on.

FIG. 8 shows the swinging member as the drum beater is rotating when the pedal is stepped on.

DESCRIPTION OF A PREFERRED EMBODIMENT

Figure 1:
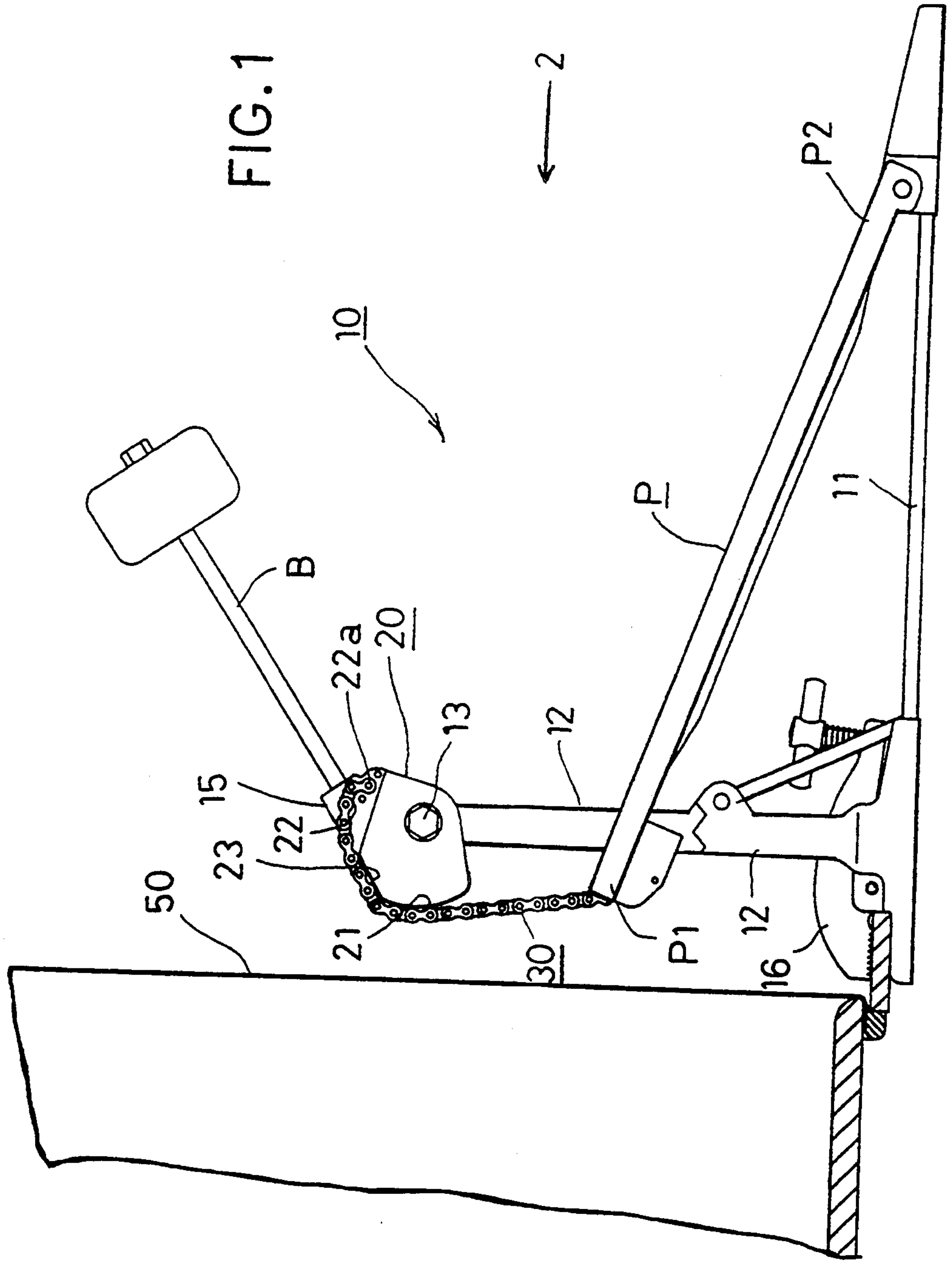
FIG. 1 is a side view of an example of a foot pedal for a drum according to the invention.
Figure 2:
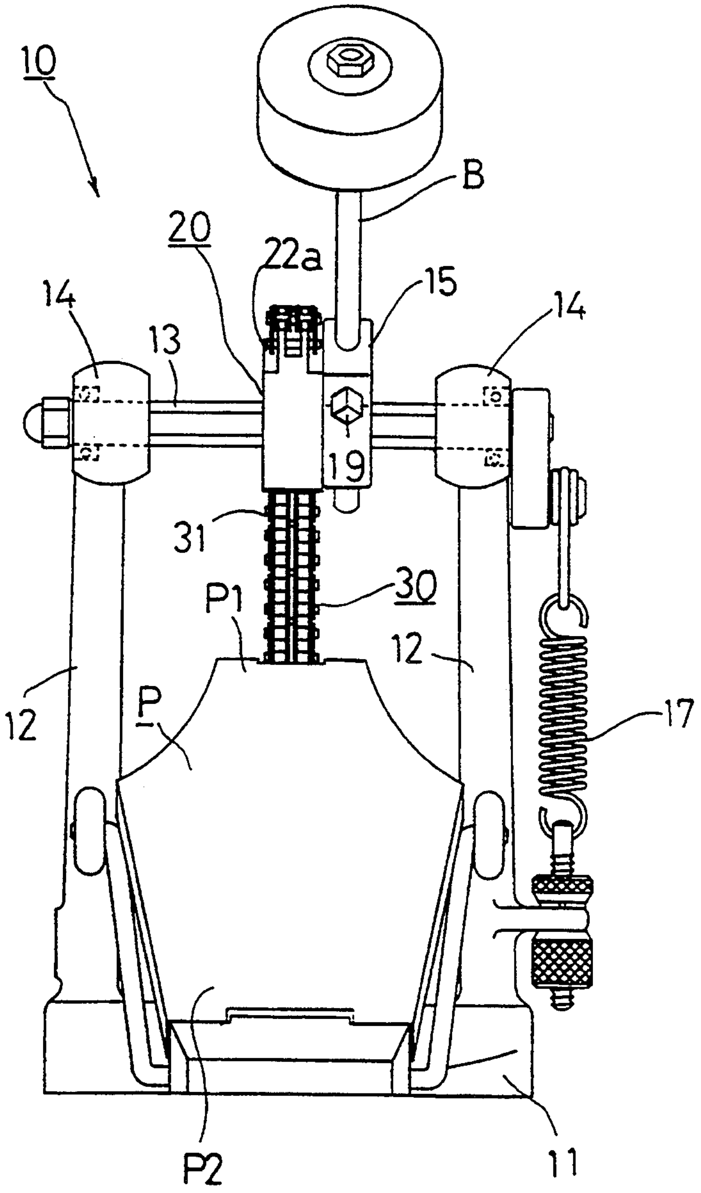
FIG. 2 is an end view thereof.
Figure 3:
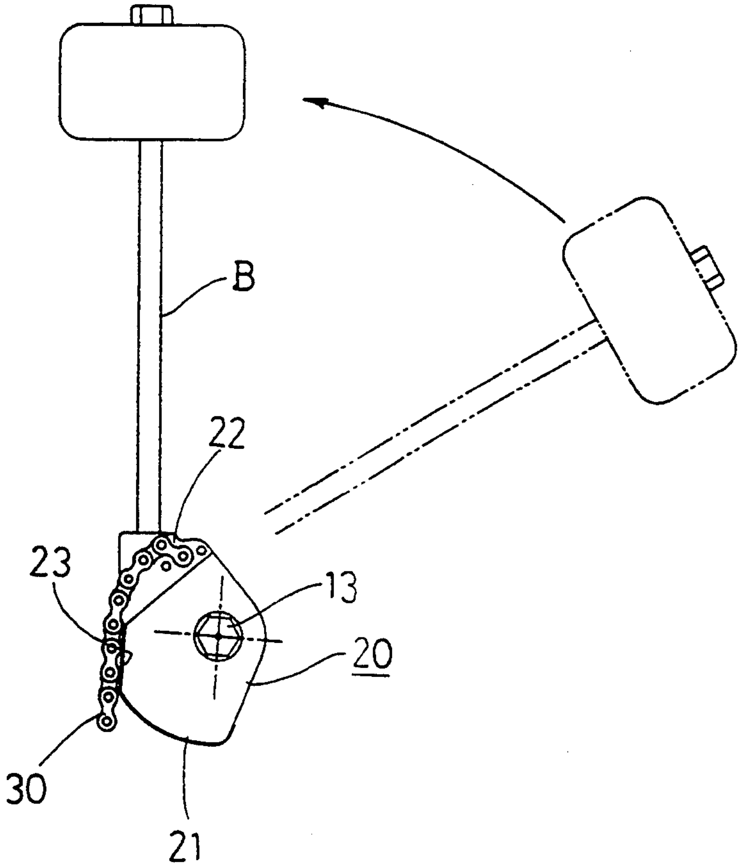
FIG. 3 is a side view thereof showing essential parts.

FIGS. 1 through 3 show one example of a foot pedal 10 for a drum according to the invention. It includes a base 11 having supports 12 which are erected on both sides of the base 11. A beater rotary shaft 13 is freely rotatably installed in the upper portions of the supports through ball bearings 14. The beater rotary shaft 13 provides means for pivoting a beater B about the axis of the shaft 13 which thus serves as a pivot axis for the beater B.

Approximately at the center of the beater rotary shaft 13, a combined beater installation member 15 and a swinging member 20, which rotate integrally together, are installed. They cooperate to swing the beater B. A hoop clamp 16 on the base 11 clamps the drum beater pedal to the drum hoop. A return spring acts on a crank on the shaft 13 to return the shaft to move the beater away from the drum. A fixing screw on the member 15 secures the beater B.

Figure 4:
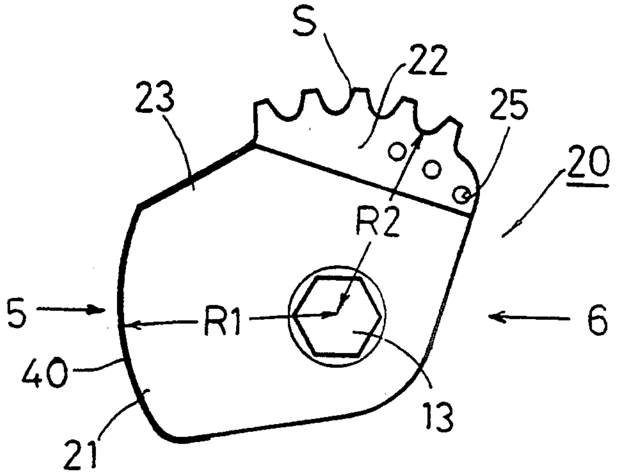
FIG. 4 is a side view of the swinging member of the drum pedal.
Figure 5:
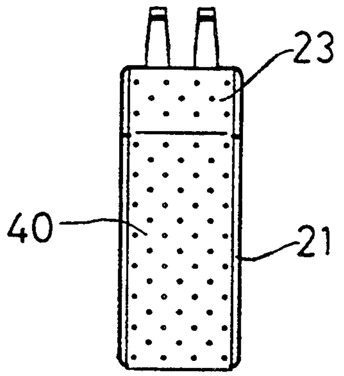
FIG. 5 is a rear view thereof.
Figure 6:
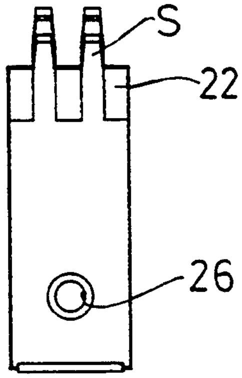
FIG. 6 is a front view thereof.

As shown in FIGS. 4 through 6, the swinging member 20 comprises a large diameter arcuate wheel segment 21 at the front side of the member 20 toward the drum and a small diameter wheel segment 22 which is installed behind the large diameter wheel segment 21 through an intermediate part 23. Installation parts 25 toward the rear of the wheel segment 22 are for receiving one end of a linking member 30. A screw hole at a side of the member 20 receives a screw adapted for fixing the swinging member 20 to the beater rotary shaft 13.

The large diameter wheel segment 21 has an arc of the radius R1 and its shape corresponds to that of a segment of conventional genuinely round wheel. The segment 21 is formed on the front side of the member 20, that is the side that is toward the drum head 50. This causes the segment 21 to cause the movement of the beater B until immediately before the beating of the drum head.

The small diameter wheel segment 22 has the shape of an arc of a radius R2 which is smaller than the radius of the large diameter wheel segment 21. In this example, the segment 22 consists of a partial sprocket S. The small diameter wheel segment 22 works on the movement of the beater B during the time period ranging from immediately before beating of the drum head until the beating of the drum head by the beater B.

The intermediate part 23 provides a smooth linking transition over the difference between the respective radii R1 and R2 between the large diameter wheel segment 21 and the small diameter wheel segment 22.

One end of a flexible, strap like, wrappable linking member 30 is provided at a terminal **22*a* of the small diameter wheel segment. The linking member winds onto the outer periphery of the swinging member 20**.

The linking member is wrapped over the intermediate part 23 and the large diameter wheel segment 21. The other end of the linking member is linked to the free swing end tip P1 of the pedal plate P. The linking member 30 comprises a chain, strap, etc.

Pedal plate P has its rear end P2 journaled freely rotatably on the base 11 so that the tip swings up and down. As the pedal plate P is stepped on, the linking member chain 30 is pulled down and this causes the swinging member 20 to rotate. That in turn rotates the beater installation member 15 which swings the attached beater B to beat the drum head 50.

As seen in FIG. 5, the outer peripheral surfaces of the large diameter wheel segment 21 and intermediate part 23 are curved surfaces each having a sound arresting material 40 applied or pasted thereon. This material is for reducing noise which is generated by the engagement between the swinging member 20 and the linking member 30 at the time of the stepping on the aforementioned pedal plate P. The noise in part would be caused by the metallic material of the member 30.

As can be understood from FIG. 2, the linking member 30 is comprised of two rows of chains 31. This makes it possible to prevent the possible twisting or side swaying of the pedal plate P which could stem from the stepping on operation of the pedal plate, thereby ensuring accurate pedal operation.

Figure 7:
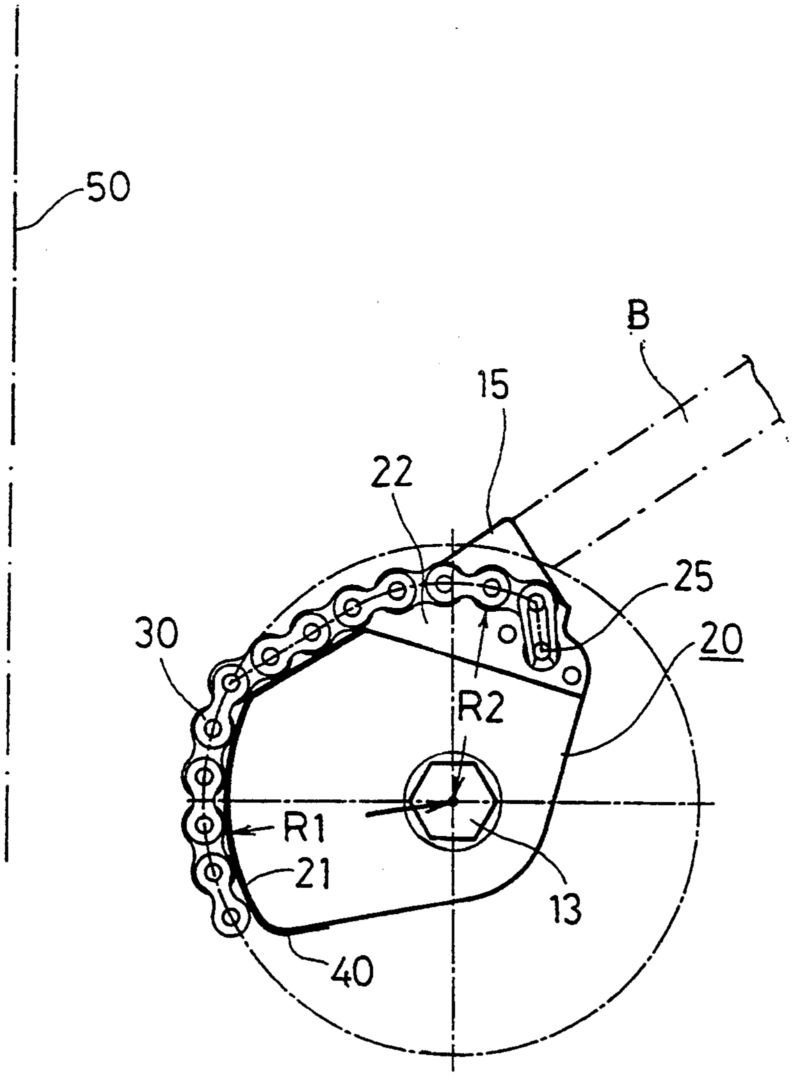
Figure 8:
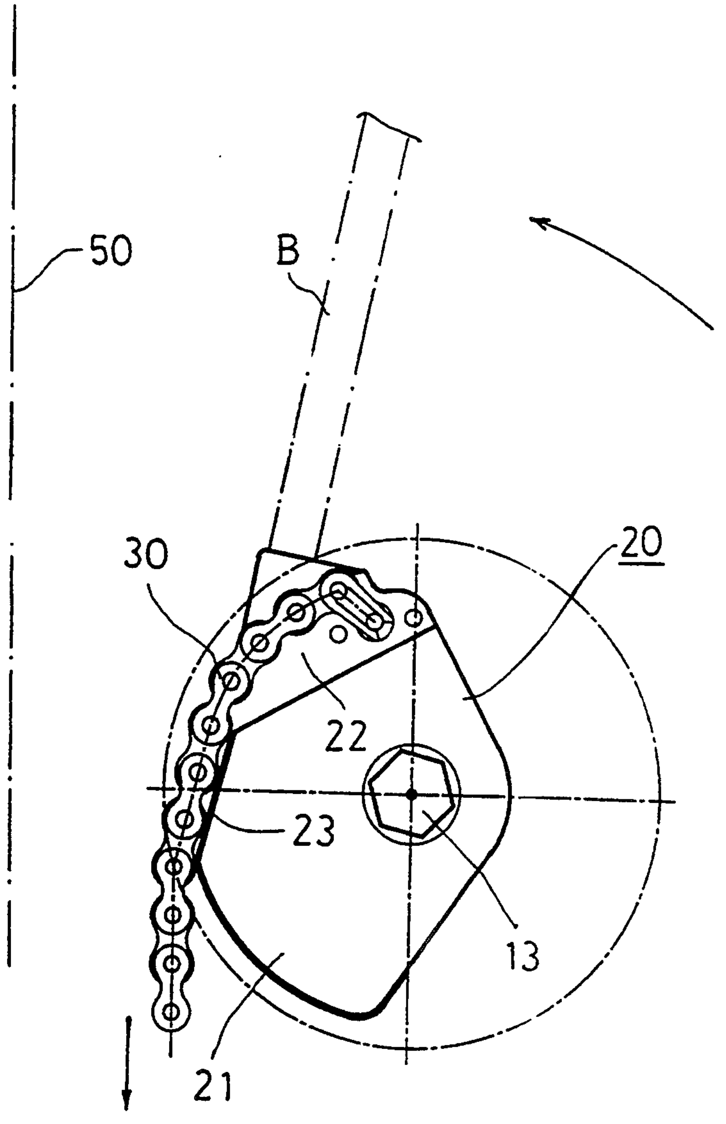
Figure 9:
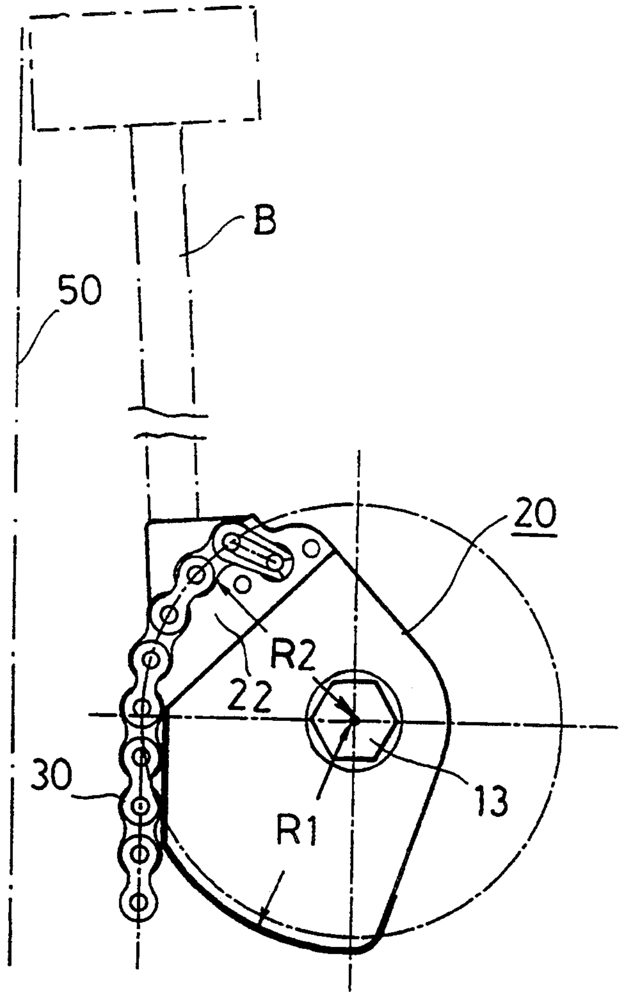
FIG. 9 shows the swinging member in its state immediately before beating of the drum head.
Figure 10:
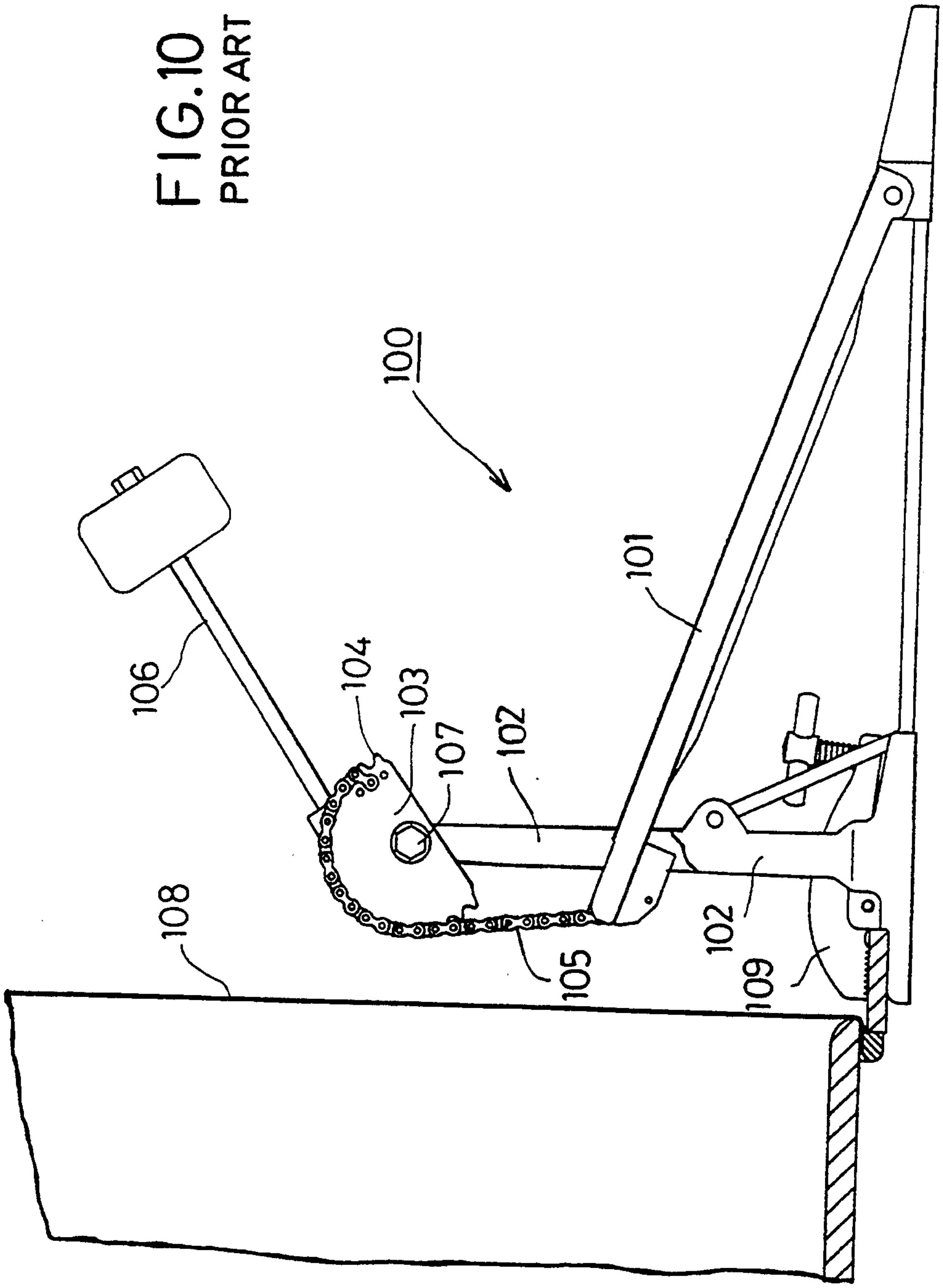
FIG.10 PRIOR ART
FIG. 10 shows a side view of one example of a foot pedal for a drum according to the prior art.
Figure 11:
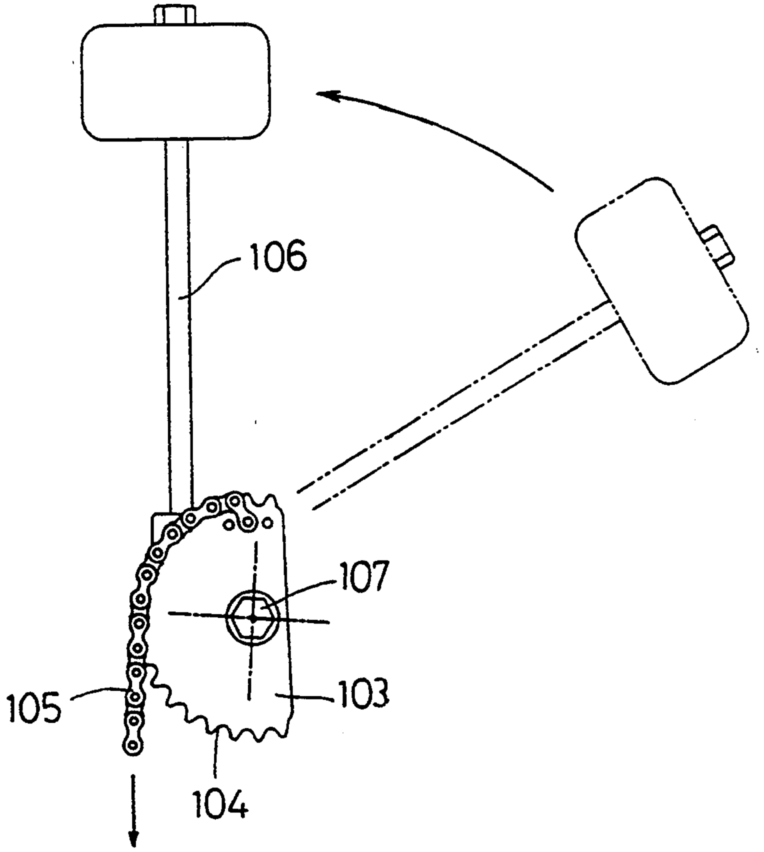
FIG.11 PRIOR ART
FIG. 11 is a side view showing its essential parts.
Figure 12:
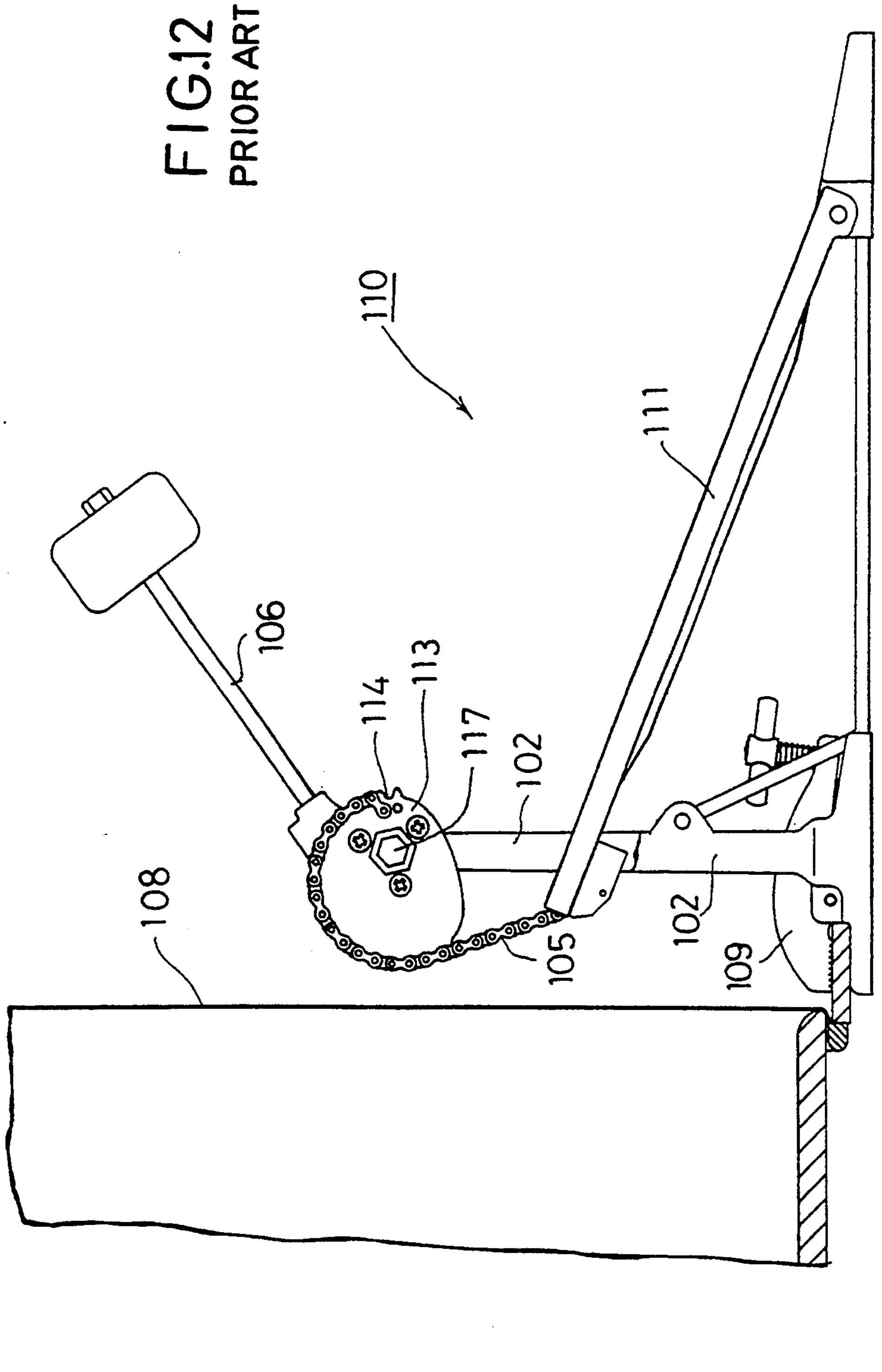
FIG.12 PRIOR ART
FIG. 12 is a side view of another embodiment of a foot pedal for a drum according to the prior art.
Figure 13:
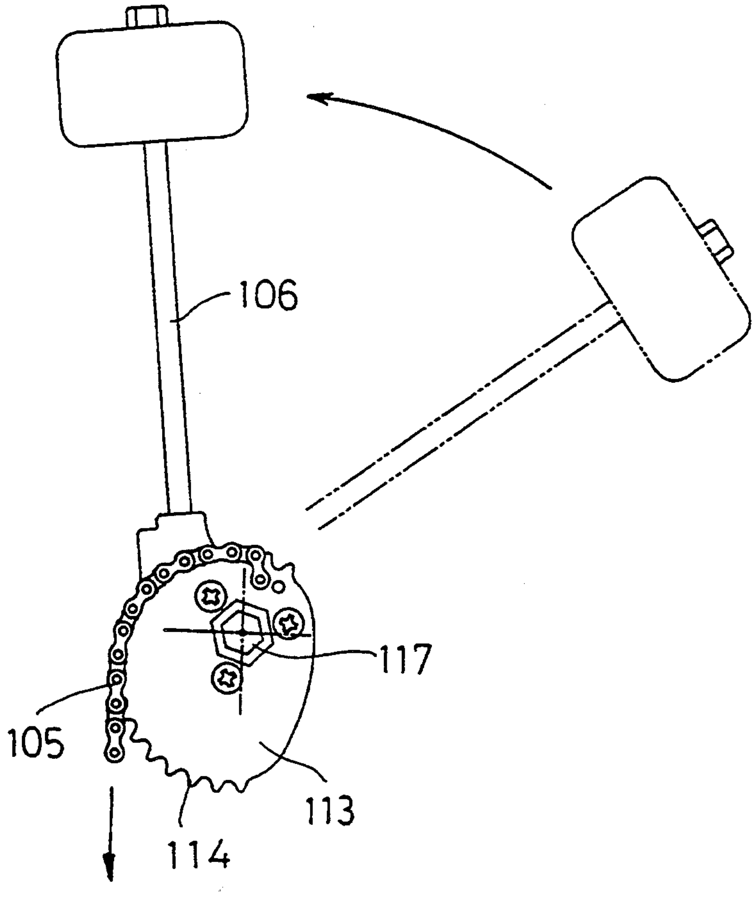
FIG.13 PRIOR ART
FIG. 13 is a side view showing its essential parts.

FIGS. 7 through 9 show the stages of the action of the foot pedal for the drum. The swinging speed is determined by the section of the swinging member off which the linking member is moving at a particular time. As shown in FIG. 7, the swinging speed of the beater B is affected by the large diameter wheel segment 21 of the swinging member 20 immediately after the stepping on of the pedal plate P. The movement of the pedal plate is transmitted to the beater rotary shaft 13 through the linking member 30. Because the linking member is then peeling off the segment 21, that segment controls the extent of swinging of the member 20 and of the beater B. As a consequence, this produces an operating feeling which is mild and without any peculiar idiosyncracy, retaining the advantage of a conventional genuinely round wheel.

FIG. 8 shows the state when the pedal plate P has been stepped further, i.e. where the speed of the beater B is affected by the large diameter wheel segment 21 and intermediate part 23.

FIG. 9 shows the state in which the pedal plate P has been stepped up to immediately before the beating of the drum head 50 by the beater B. Here the rotation of the beater rotary shaft 13 is affected only by the small diameter wheel segment 22 of the swinging member 20 off which the linking member is then peeling.

Since the radius of the swinging member 20 that works on the beater B becomes smaller as the pedal plate P is stepped further, the rotary angle of the swinging member 20, as compared with the pull down length of the linking member 30, becomes larger. Consequently, the operating speed of the beater B can be accelerated immediately before it beats the drum head 50.

Because the beater B is accelerated not only by the stepping speed of the pedal controlled by the performer but by the shape of the swinging member of the foot pedal as well, this permits rendering a more powerful performance.

Because the arcuate distance over which the small diameter wheel segment 22 works on the beater B is very small, the return speed of the pedal is the same as that for a genuinely round wheel.

As has been explained above, the beater B is worked on by a large diameter wheel segment corresponding to a genuinely round wheel until immediately before the beating of the drum head. The beater is operated by a small diameter wheel segment which has the advantage of an eccentric wheel starting immediately before the beating and including the actual beating.

Accordingly, it becomes possible to suitably accelerate the beater action speed while the performer experiences the operating feeling provided by a genuinely round wheel of the foot pedal. This makes it possible to carry out fine beatings and powerful beatings during the performance.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A foot pedal operated beater mechanism for a drum comprising:

a stand, a foot pedal movably supported to the stand and moveable upon being stepped on;

pivot means on the stand; the pivot means having a pivot axis and a drum beater connected with the pivot means, the beater being pivotable around the pivot means from an inoperative position with the beater spaced away from the drum toward an operative position with the beater banging the drum;

a beater swinging member attached to the beater and rotatable on the pivot means for swinging the beater between the inoperative and operative positions;

a flexible, strap like, linking member extending between the movable pedal and the swinging member so that stepping on the pedal causes the linking member to move the swinging member to swing the beater from the inoperative to the operative position;

the swinging member having a surface spaced out from the pivot axis of the pivot means on which the linking member is wrapped, and the linking member selectively wrapping onto and moving off the surface of the swinging member as the linking member rotates the swinging member;

the swinging member surface engaged by the linking member including a large diameter curvature part, having an arc of a first constant radius, placed around the surface of the swinging member so that the linking member moves off the large diameter part as the beater is swung from the inoperative toward the operative position; and a small diameter curvature part, having an arc of a second constant radius which is smaller than the first constant radius, placed around the surface of the swinging member so that the linking member moves off the small diameter part of the swinging member from slightly before the operative beating position up to the beating position.

2. The foot pedal operated beater mechanism of claim 1, wherein the swinging member has a side generally toward the drum, the linking member being wrapped around the surface of the swinging member so that the linking member separates from the surface of the swinging member at the side of the swinging member generally toward the drum, and the pedal is disposed beneath the swinging member so that stepping on the pedal rotates the swinging member to swing the beater toward the drum.

3. The foot pedal operated beater mechanism of claim 2, wherein the foot pedal is supported to pivot on the stand and the linking member is connected to the foot pedal spaced out from the pivot of the foot pedal.

4. The foot pedal operated beater mechanism of claim 1, further comprising a return spring connected with the swinging member for returning the swinging member and the beater to the inoperative position when the pedal is not stepped on.

5. The foot pedal operated beater mechanism of claim 1, wherein the surface of the swinging member further includes an intermediate part between the large diameter part and the small diameter part.

6. The foot pedal operated beater mechanism of claim 4, wherein the large diameter part of the swinging member comprises a larger diameter segment of a circle with the pivot means as its center and the small diameter part comprises a small diameter segment of a circle with the pivot means as its center.

7. The foot pedal operated beater mechanism of claim 1, wherein the linking member comprises a flexible strap and the pedal is spaced away from the swinging member so that movement of the pedal moves the linking member off the swinging member surface.

8. The foot pedal operated beater mechanism of claim 1, wherein the swinging member surface includes sound arresting material thereon for reducing the noise generated by the linking member moving off or on the surface of the swinging member.

9. The foot pedal operated beater mechanism of claim 8, wherein the linking member comprises a link chain.

10. The foot pedal operated beater mechanism of claim 9, wherein the surface has a sprocket defined thereon and the link chain engages on the sprocket.

11. The foot pedal operated beater mechanism of claim 1, wherein the linking member comprises a link chain.

12. The foot pedal operated beater mechanism of claim 11, wherein the surface has a sprocket defined thereon and the link chain engages on the sprocket.

* * * * *